United States Patent
Yamasaki et al.

(10) Patent No.: US 9,120,901 B2
(45) Date of Patent: Sep. 1, 2015

(54) METHOD FOR PRODUCING PSEUDOPOLYROTAXANE

(75) Inventors: Tomoaki Yamasaki, Hyogo (JP); Shinya Okazaki, Hyogo (JP); Hiroki Okazaki, Hyogo (JP); Shigeki Hamamoto, Hyogo (JP); Changming Zhao, Chiba (JP)

(73) Assignees: Sumitomo Seika Chemicals Co., Ltd., Hyogo (JP); Advanced Softmaterials Inc., Chiba (JP)

(*) Notice: Subject to any disclaimer, the term of this patent is extended or adjusted under 35 U.S.C. 154(b) by 5 days.

(21) Appl. No.: 13/994,529

(22) PCT Filed: Dec. 5, 2011

(86) PCT No.: PCT/JP2011/078018
§ 371 (c)(1),
(2), (4) Date: Jul. 25, 2013

(87) PCT Pub. No.: WO2012/081430
PCT Pub. Date: Jun. 21, 2012

(65) Prior Publication Data
US 2013/0317209 A1  Nov. 28, 2013

(30) Foreign Application Priority Data
Dec. 16, 2010  (JP) .................................. 2010-280265

(51) Int. Cl.
*C08G 83/00* (2006.01)
*C08B 37/16* (2006.01)
*C08J 3/12* (2006.01)
*C08J 3/14* (2006.01)
*C08L 71/02* (2006.01)

(52) U.S. Cl.
CPC .......... *C08G 83/007* (2013.01); *C08B 37/0015* (2013.01); *C08J 3/12* (2013.01); *C08J 3/14* (2013.01); *C08L 71/02* (2013.01); *C08J 2371/02* (2013.01)

(58) Field of Classification Search
CPC ..... C08G 83/007; C08B 37/0015; C08J 3/12; C08J 3/14; C08L 71/02; C08L 5/16
USPC ....................................................... 536/103
See application file for complete search history.

(56) References Cited

U.S. PATENT DOCUMENTS

| | | | |
|---|---|---|---|
| 5,855,900 | A | 1/1999 | Nobuhiko |
| 6,037,387 | A | 3/2000 | Yui et al. |
| 6,100,329 | A | 8/2000 | Gibson et al. |
| 6,828,378 | B2 | 12/2004 | Okumura et al. |
| 2001/0033868 | A1 | 10/2001 | Rossling et al. |
| 2005/0101624 | A1 | 5/2005 | Betts et al. |
| 2005/0123614 | A1 | 6/2005 | Kim et al. |
| 2006/0069168 | A1 | 3/2006 | Tabata et al. |
| 2008/0097039 | A1 | 4/2008 | Ito et al. |
| 2009/0088546 | A1* | 4/2009 | Ito et al. ........................ 527/300 |
| 2009/0312490 | A1 | 12/2009 | Ito et al. |
| 2010/0274002 | A1 | 10/2010 | Amann et al. |
| 2013/0296546 | A1 | 11/2013 | Yamasaki et al. |
| 2013/0296547 | A1 | 11/2013 | Yamasaki et al. |
| 2013/0331562 | A1 | 12/2013 | Yamasaki et al. |
| 2014/0066615 | A1 | 3/2014 | Yamasaki et al. |
| 2014/0066616 | A1 | 3/2014 | Yamasaki et al. |

FOREIGN PATENT DOCUMENTS

| | | |
|---|---|---|
| CN | 1426424 | 6/2003 |
| CN | 1910218 | 2/2007 |
| CN | 1938367 | 3/2007 |
| EP | 1 921 105 | 5/2008 |
| EP | 1 942 163 | 7/2008 |
| EP | 2 653 482 | 10/2013 |
| JP | 03-237103 | 10/1991 |
| JP | 2002-508401 | 3/2002 |
| JP | 2005-272664 | 10/2005 |
| JP | 2006-316089 | 11/2006 |
| JP | 2007-063412 | 3/2007 |
| JP | 2007-092024 | 4/2007 |
| JP | 2008-310286 | 12/2008 |
| WO | 99/30744 | 6/1999 |
| WO | WO 2005/080469 | 9/2005 |

OTHER PUBLICATIONS

Topchieva et al. Two-Phase Channel Structures Based on α-Cyclodextrin- Polyethylene Glycol Inclusion Complexes. Langmuir 20:9036, 9043, 2004.*
"Kagaku Daijiten 2", Kyoritsu Shuppan Co., Ltd., 1993, Pocket Edition, 34th Impression, pp. 658-659, with partial translation.
"Kagaku Daijiten 8", Kyoritsu Shuppan Co., Ltd., 1987, Pocket Edition, 30th Impression, pp. 214-215, with partial translation.
Hedges AR, "Industrial Applications of Cyclodextrins", Chem Rev 98:2035-2044, 1998.
Guo, et al., "Spray Drying (1st edition)", pp. 1-6, 1983 with a full English translation.
Liu et al., "Solvent-Free Synthesis of Unmodified Cyclodextrin-Based Pseudopolyrotaxane and Polyrotaxane by Grinding", Polymer Journal, vol. 39, No. 1, Jan. 15, 2007, pp. 21-23.
Fleury et al., "Synthesis and characterization of high molecular weight polyrotaxanes: towards the control over a wide range of threaded α-cyclodedextrins", Soft Matter, vol. 1, No. 5, Jan. 1, 2005, pp. 378-385.
Lavett, et al., "Vacuum Drying", The Journal of Industrial and Engineering Chemistry, vol. 13, No. 7, pp. 600-605, Jul. 1921.
Guo, et al., "Spray Drying (1st Edition)", pp. 191, 193-195, 1983 with a full English translation.
Pan, et al., "Modern Drying Technology, the 1st Edition", Chemical Industry Press, Sep. 30, 1998, line 1 on p. 121 to line 8 on p. 122—with a full translation.

* cited by examiner

*Primary Examiner* — Mark Shibuya
*Assistant Examiner* — Yih-Horng Shiao
(74) *Attorney, Agent, or Firm* — Hamre, Schumann, Mueller & Larson, P.C.

(57) ABSTRACT

The present invention aims to provide an industrially advantageous method of producing a pseudopolyrotaxane with a high inclusion ratio. The present invention relates to a method for producing a pseudopolyrotaxane, including: an inclusion step of mixing a polyethylene glycol and a cyclodextrin in an aqueous medium to form an aqueous dispersion of pseudopolyrotaxane that contains pseudopolyrotaxane particles in which the polyethylene glycol is included in the cavities of the cyclodextrin molecules in a skewered manner; and a drying step of drying the aqueous dispersion of pseudopolyrotaxane produced in the inclusion step to obtain the pseudopolyrotaxane. In the drying step, the aqueous dispersion of pseudopolyrotaxane is dried in a thin film state.

9 Claims, No Drawings

METHOD FOR PRODUCING PSEUDOPOLYROTAXANE

TECHNICAL FIELD

The present invention relates to a method for producing a pseudopolyrotaxane.

BACKGROUND ART

Crosslinked polyrotaxanes are produced by crosslinking polyrotaxanes in which a capping group is introduced at each end of a pseudopolyrotaxane. In the case that a pseudopolyrotaxane is formed from a polyethylene glycol (hereinafter, also referred to as a "PEG") and a cyclodextrin that includes the PEG, for example, the resultant crosslinked polyrotaxane has a structure in which linear molecules of the PEG thread through cyclodextrin molecules in a skewered manner and the cyclodextrin molecules are movable along the linear molecules (has a pulley effect). The pulley effect allows the crosslinked polyrotaxane to uniformly distribute tensile force applied thereto. The crosslinked polyrotaxane is therefore not likely to have cracks or flaws, i.e., has excellent characteristics that conventional crosslinked polymers do not have.

The pseudopolyrotaxanes used for production of crosslinked polyrotaxanes are generally produced by mixing a PEG and a cyclodextrin in an aqueous medium. Accordingly, the resultant pseudopolyrotaxanes are obtained in the form of an aqueous dispersion. Efficient formation of a polyrotaxane by introduction of a capping group to each end of a pseudopolyrotaxane with a chemically stable bond can be achieved by a reaction between a PEG with a —COOH group at each end and a capping group reactive with the —COOH group, such as a —NH$_2$ group or a —OH group.

This reaction of introducing a capping group to each end of a pseudopolyrotaxane, however, is deactivated by moisture in the system. Thus, the reaction requires the absence of water in the reaction system, or the water content controlled to an extremely slight amount, for efficient proceeding thereof. In other words, the aqueous dispersion of pseudopolyrotaxane requires sufficient elimination of water by drying the aqueous dispersion after solid-liquid separation by, for example, centrifugation or filtration, or drying without such separation.

Patent Literature 1 discloses that suspension of a precipitate of a PEG/α-cyclodextrin inclusion compound (pseudopolyrotaxane) in water and heating of the suspension to 70° C. or higher lead to a decrease in the inclusion ability and release of cyclodextrin molecules. Therefore, drying the aqueous dispersion of pseudopolyrotaxane at 70° C. or higher may cause a decrease in the inclusion ratio. The decrease in the inclusion ratio deteriorates the pulley effect of the crosslinked polyrotaxane, whereby the desired properties are not achieved. Accordingly, aqueous dispersions of pseudopolyrotaxane have been mainly freeze-dried or dried under decreased pressure at 70° C. or lower.

For example, Patent Literature 2 discloses a method in which an aqueous dispersion of pseudopolyrotaxane added in acetone, and the pseudopolyrotaxane is precipitated and then filtered, and the resultant product is vacuum dried at room temperature. However, the moisture in the pseudopolyrotaxane cannot be sufficiently eliminated by replacing the medium with acetone and filtering. Accordingly, drying at room temperature cannot completely eliminate the moisture, and residual moisture inhibits the reaction of introducing a capping group at each end of the pseudopolyrotaxane.

CITATION LIST

Patent Literature

Patent Literature 1: JP 3-237103 A (Japanese Kokai Publication No Hei-3-237103)
Patent Literature 2: JP 2005-272664 A (Japanese Kokai Publication No 2005-272664)

SUMMARY OF INVENTION

Technical Problem

Conventional drying methods are performed at a temperature equal to or lower than the boiling point of water that is the dispersing medium. Therefore, it requires not only an extremely long drying time but also, in the case of the freeze-drying method, costs for preparing and running large equipment.

Another problem is that even a heating temperature of 70° C. or lower causes a pseudopolyrotaxane to release cyclodextrin when it contains moisture and is dried for a long time.

The present invention aims to provide an industrially advantageous method of producing a dry pseudopolyrotaxane with a high inclusion ratio and solves the above problems.

Solution to Problem

The present invention relates to a method for producing a pseudopolyrotaxane, including: an inclusion step of mixing a PEG and a cyclodextrin in an aqueous medium to form an aqueous dispersion of pseudopolyrotaxane that contains pseudopolyrotaxane particles in which the PEG is included in the cavities of the cyclodextrin molecules in a skewered manner; and a drying step of drying the aqueous dispersion of pseudopolyrotaxane produced in the inclusion step to obtain the pseudopolyrotaxane, in the drying step, the aqueous dispersion of pseudopolyrotaxane being dried in a thin film state.

The present invention is described in detail below.

The present inventors have found that drying the aqueous dispersion of pseudopolyrotaxane in a thin film state in the drying step enables industrially advantageous production of a dry pseudopolyrotaxane with a high inclusion ratio, thereby completing the present invention.

The method for producing a pseudopolyrotaxane of the present invention includes an inclusion step of mixing a PEG and a cyclodextrin in an aqueous medium to form an aqueous dispersion of pseudopolyrotaxane that contains pseudopolyrotaxane particles in which the PEG is included in the cavities of the cyclodextrin molecules in a skewered manner.

The PEG preferably has a weight average molecular weight of 1,000 to 500,000, more preferably 10,000 to 300,000, and still more preferably 10,000 to 100,000. A weight average molecular weight of the PEG of less than 1,000 may result in poor characteristics of a crosslinked polyrotaxane. A weight average molecular weight of the PEG of more than 500,000 may cause the aqueous dispersion of pseudopolyrotaxane to have low fluidity, which makes it difficult to make the aqueous dispersion of pseudopolyrotaxane into a thin film state in the drying step.

The weight average molecular weight herein is a polyethylene glycol equivalent value calculated through measurement by gel permeation chromatography (GPC). A column used for determination of a polyethylene glycol equivalent weight average molecular weight by GPC is, for example, TSKgel SuperAWM-H (product of TOSOH CORPORATION).

The PEG preferably has a reactive group at each end of the linear molecule. The reactive group can be introduced at each end of the linear molecule by a conventionally known method.

The reactive group introduced at each end of the linear molecule can be appropriately changed depending on the capping group to be used. Examples of the reactive group include, but not particularly limited to, hydroxyl, amino, carboxyl, and thiol groups. Carboxyl group is particularly preferred. Examples of the method for introducing a carboxyl group at each end of the linear molecule include a method of oxidizing each end of the linear molecule using TEMPO (2,2,6,6-tetramethyl-1-piperidinyloxy radicals) and sodium hypochlorite.

In the inclusion step, the weight ratio between the PEG and the cyclodextrin is preferably 1:2 to 1:5, more preferably 1:2.5 to 1:4.5, and still more preferably 1:3 to 1:4. A weight of the cyclodextrin of less than twice the weight of the PEG may decrease the number (i.e., inclusion amount) of cyclodextrin molecules including the PEG. A weight of the cyclodextrin of more than five times the weight of the PEG may not increase the inclusion amount further, and thus is not economical.

Examples of the cyclodextrin include α-cyclodextrin, β-cyclodextrin, γ-cyclodextrin, and derivatives of these cyclodextrins. Particularly in terms of inclusion property, α-cyclodextrin is preferred. These cyclodextrins may be used alone or in combination.

Examples of the aqueous medium include water, and aqueous mixtures of water and an aqueous organic solvent such as DMF and DMSO. Particularly, water is preferred.

The only required condition for mixing the PEG and the cyclodextrin in the inclusion step is mixing them in the above aqueous medium. Preferably, the PEG and the cyclodextrin are dissolved in the aqueous medium. Specifically, the PEG and the cyclodextrin are added to the aqueous medium and this pre-mixture is typically heated to 50° C. to 100° C., preferably 60° C. to 90° C., and more preferably 70° C. to 80° C., so that the components are dissolved in the aqueous medium. This provides a substantially transparent mixed solution.

Cooling the resulting mixed solution of the PEG and the cyclodextrin precipitates pseudopolyrotaxane particles of the PEG and the cyclodextrin, resulting in a basically white aqueous dispersion of pseudopolyrotaxane.

If the mixed solution is continuously or intermittently cooled while being flowed so that pseudopolyrotaxane particles are precipitated, the resulting aqueous dispersion of pseudopolyrotaxane has good fluidity, and does not cause a decrease in fluidity with time. Accordingly, the aqueous dispersion of pseudopolyrotaxane can be easily made into a thin film state in the drying step.

If the mixed solution is cooled while being left to stand for precipitation of pseudopolyrotaxane particles, the resulting aqueous dispersion of pseudopolyrotaxane is turned into the form of paste or cream which has very low fluidity, or into the form of gel which has no fluidity. Since an aqueous dispersion of pseudopolyrotaxane turned into the form of paste or cream also loses its fluidity with time, such an aqueous dispersion is preferably stirred and mixed under suitable conditions so as to be fluid before the drying step.

The mixed solution is preferably cooled to an end-point temperature of 0 to 30° C., more preferably 1 to 20° C., and still more preferably 1 to 15° C. An end-point temperature of the mixed solution of lower than 0° C. may freeze the aqueous dispersion of pseudopolyrotaxane to decrease the fluidity. An end-point temperature of the mixed solution of higher than 30° C. may not sufficiently precipitate pseudopolyrotaxane particles.

The mixed solution is preferably cooled at a cooling speed of 0.01 to 30° C./min, more preferably 0.05 to 20° C./min, and still more preferably 0.05 to 10° C./min. A cooling speed in cooling the mixed solution of lower than 0.01° C./min may precipitate very fine pseudopolyrotaxane particles, resulting in a decrease in fluidity of the resulting aqueous dispersion of pseudopolyrotaxane. A cooling speed in cooling the mixed solution of higher than 30° C./min may produce large pseudopolyrotaxane particles which decrease the distribution stability of the resulting aqueous dispersion of pseudopolyrotaxane, leading to sedimentation.

For more thorough precipitation of pseudopolyrotaxane particles, intermittent cooling is also possible as described above. Also, the cooling speed or the flowing state of the mixed solution can be changed during the cooling.

The time for retaining the flowing state of the resulting aqueous dispersion of pseudopolyrotaxane after the mixed solution is cooled to a desired temperature is typically several seconds to one week, and preferably several hours to three days.

The method of flowing the mixed solution while cooling the mixed solution may be a known method such as stirring with stirring blades and ultrasonic irradiation.

The degree of flowing the mixed solution is not particularly limited, and may be optionally selected from the range of slight flowing of the mixed solution caused by gentle stirring to strong flowing caused by vigorous stirring using a homogenizer. Excessively weak flowing may precipitate large pseudopolyrotaxane particles, which decreases the distribution stability of the resulting aqueous dispersion of pseudopolyrotaxane, likely leading to sedimentation. In contrast, excessively strong flowing may precipitate very fine pseudopolyrotaxane particles, likely leading to decreased fluidity of the resultant aqueous dispersion of pseudopolyrotaxane.

If the mixed solution is cooled without being flowed, an aqueous dispersion of pseudopolyrotaxane is turned into the form of gel which has very low fluidity or no fluidity.

The volume average particle size of the particles in the aqueous dispersion of pseudopolyrotaxane varies depending on the cooling speed, the end-point temperature after the cooling, and the flowing state of the mixed solution during the cooling. The volume average particle size is preferably 1 to 200 μm, more preferably 1 to 100 μm, and still more preferably 1 to 50 μm, in terms of the fluidity and the distribution stability of the aqueous dispersion of pseudopolyrotaxane. If the volume average particle size of the particles in the aqueous dispersion of pseudopolyrotaxane is less than 1 μm, the dispersion may show decreased fluidity or no fluidity. If the volume average particle size of the particles in the aqueous dispersion of pseudopolyrotaxane is more than 200 μm, the particles in the aqueous dispersion of pseudopolyrotaxane may be sedimented.

The volume average particle size of the particles in the aqueous dispersion of pseudopolyrotaxane herein can be analyzed using a laser diffraction particle size analyzer.

The pseudopolyrotaxane concentration of the aqueous dispersion of pseudopolyrotaxane (hereinafter, also referred to as a "solids concentration") is preferably 5 to 25% by weight, more preferably 5 to 20% by weight, and still more preferably 10 to 20% by weight. A solids concentration of the aqueous dispersion of pseudopolyrotaxane of lower than 5% by weight is not economical. A solids concentration of the aqueous dispersion of pseudopolyrotaxane of higher than 25% by weight may decrease the fluidity of the aqueous dispersion of pseudopolyrotaxane, causing difficulty in making the dispersion into a thin film state in the drying step.

The method for producing a pseudopolyrotaxane of the present invention includes a drying step of drying the aqueous dispersion of pseudopolyrotaxane produced in the inclusion step to obtain a pseudopolyrotaxane.

In the drying step, the aqueous dispersion of pseudopolyrotaxane is dried in a thin film state.

Examples of the method for making the aqueous dispersion of pseudopolyrotaxane into a thin film state include a spray coating method, a spin coating method, and a dip-coating method.

When the aqueous dispersion of pseudopolyrotaxane is made into a thin film state, the thickness thereof is preferably 0.1 to 2 mm, more preferably 0.1 to 1 mm, and still more preferably 0.1 to 0.5 mm. A thickness of a thin film-like aqueous dispersion of pseudopolyrotaxane of lower than 0.1 mm may decrease the yield per hour, which is not economical. A thickness of a thin film-like aqueous dispersion of pseudopolyrotaxane of higher than 2 mm may result in insufficient drying of the aqueous dispersion of pseudopolyrotaxane.

The method for controlling the thickness of a thin film-like aqueous dispersion of pseudopolyrotaxane depends on factors such as the type of dryer to be used and the like. In the case of the drum dryer mentioned later, for example, the thickness of a thin film-like aqueous dispersion of pseudopolyrotaxane may be appropriately controlled by changing the drum interval, the drum rotation speed, the feeding speed of the aqueous dispersion of pseudopolyrotaxane, and the like.

Examples of the dryer used in the drying step include drum dryers and centrifugal thin film dryers. Preferable among these are drum dryers because they are usable even when the aqueous dispersion of pseudopolyrotaxane has extremely low fluidity.

In the case of a drum dryer, for example, the aqueous dispersion of pseudopolyrotaxane is applied to the surface of a heated drum so as to be in a thin film state, and then promptly evaporated to dryness. The dried product is continuously scraped with a fixedly mounted knife while the drum makes one rotation, thereby yielding a dry pseudopolyrotaxane.

The drying temperature in the drying step is preferably 70 to 200° C., more preferably 90 to 180° C., and still more preferably 100 to 170° C. A drying temperature of lower than 70° C. may lead to insufficient drying. A drying temperature of higher than 200° C. may decompose the pseudopolyrotaxane to decrease the inclusion ratio.

The pressure in the system in the drying step is not particularly limited, but is typically a pressure near the atmospheric pressure. Drying under a reduced pressure is also possible, and drying under a pressure equal to or lower than the atmospheric pressure is preferred.

The drying time of the thin film-like aqueous dispersion of pseudopolyrotaxane is typically several seconds to several minutes. For suppression of release of cyclodextrin molecules, it is preferably ten minutes or shorter, more preferably five minutes or shorter, and still more preferably two minutes or shorter. Too short a drying time of the thin film-like aqueous dispersion of pseudopolyrotaxane leads to insufficient drying.

The inclusion ratio of the resulting pseudopolyrotaxane can be 6 to 60% in the present invention, although it depends on the use and purpose of the resulting dried pseudopolyrotaxane and crosslinked polyrotaxane. An inclusion ratio of lower than 6% may not give a pulley effect to the resulting crosslinked polyrotaxane. An inclusion ratio of higher than 60% may result in too dense arrangement of cyclodextrin molecules, which are cyclic molecules, so that the mobility of the cyclodextrin molecules decreases. In order to give appropriate mobility to the cyclodextrin molecules and still achieve an inclusion ratio as high as possible, the inclusion ratio is preferably 15 to 40%, and more preferably 20 to 30%.

The inclusion ratio herein refers to a ratio of the inclusion amount of cyclodextrin molecules including a PEG to the maximum inclusion amount of cyclodextrin molecules for a PEG. The inclusion ratio is optionally controllable by changing the mixing ratio of the PEG to the cyclodextrin or the kind of aqueous medium. The maximum inclusion amount refers to the number of cyclodextrin molecules in the case of the close-packed inclusion state in which one cyclodextrin molecule includes two repeating units of the PEG.

The inclusion ratio can be measured by $^1$H-NMR. If the measurement is performed in the state where a dry pseudopolyrotaxane is dissolved, cyclodextrin molecules are released, preventing measurement of a correct inclusion ratio. Accordingly, the measurement is typically performed in the state where a pseudopolyrotaxane is modified to a polyrotaxane in which a capping group is introduced at each end of the pseudopolyrotaxane so as not to have the cyclodextrin molecules be released. Thus obtained inclusion ratio can be regarded as the inclusion ratio of the dry pseudopolyrotaxane. Specifically, the inclusion ratio can be calculated by dissolving an obtained polyrotaxane in DMSO-$d_6$, subjecting the solution to measurement using an NMR measuring device (VARIAN Mercury-400BB), and comparing the integrated value of cyclodextrin peak at 4 to 6 ppm and the integrated value of cyclodextrin peak and the PEG peak at 3 to 4 ppm.

The water content of a dry pseudopolyrotaxane obtained by the method for producing a pseudopolyrotaxane of the present invention is preferably 10% by weight or lower, more preferably 7% by weight or lower, and still more preferably 5% by weight or lower. A water content of a dry pseudopolyrotaxane of more than 10% by weight increases the moisture amount in the reaction system where a capping group is introduced at each end of the pseudopolyrotaxane for preventing the release of cyclodextrin molecules. This may prevent proceeding of the reaction or decrease the introduction ratio of the capping groups.

Advantageous Effects of Invention

The present invention can provide a method for producing a pseudopolyrotaxane which includes an industrially advantageous method of producing a dry pseudopolyrotaxane with a high inclusion ratio.

DESCRIPTION OF EMBODIMENTS

The present invention is described below in more detail based on examples which, however, are not intended to limit the scope of the present invention. In the following, a PEG having a carboxyl group at each end of the linear molecule was produced by oxidation of a PEG in accordance with the method described in WO 05/052026 A.

Production Example 1

In a 1-L flask, 100 g of a PEG (weight average molecular weight: 35,000), 1 g of TEMPO (2,2,6,6-tetramethyl-1-piperidinyloxy radical), and 10 g of sodium bromide were dissolved in 1 L of water. To the solution was added 50 mL of an aqueous solution of sodium hypochlorite (effective chlorine concentration: 5%), and the resulting mixture was stirred at room temperature for 30 minutes. An amount of 50 mL of ethanol was added to decompose the excess of sodium hypochlorite and terminate the reaction.

An organic layer was isolated by repeating extraction with 500 mL of methylene chloride three times using a separating funnel, and the methylene chloride was distilled off using an evaporator. The resulting substance was dissolved in 2 L of warm ethanol, and the solution was allowed to stand in a freezer (−4° C.) overnight, so that only a PEG having a carboxyl group at each end of the linear molecule was precipitated. The PEG was collected and dried under reduced pressure. Thereby, 100 g of a PEG having a carboxyl group at each end of the linear molecule was obtained.

Production Example 2

In a 1-L flask, 100 g of a high-molecular-weight PEG (weight average molecular weight: 100,000), 1 g of TEMPO (2,2,6,6-tetramethyl-1-piperidinyloxy radical), and 10 g of sodium bromide were dissolved in 1 L of water. To the solution was added 50 mL of an aqueous solution of sodium hypochlorite (effective chlorine concentration: 5%), and the resulting mixture was stirred at room temperature for 30 minutes. An amount of 50 mL of ethanol was added to decompose the excess of sodium hypochlorite and terminate the reaction.

An organic layer was isolated by repeating extraction with 500 mL of methylene chloride three times using a separating funnel, and the methylene chloride was distilled off using an evaporator. The resulting substance was dissolved in 2 L of warm ethanol, and the solution was allowed to stand in a freezer (−4° C.) overnight, so that only a PEG having a carboxyl group at each end of the linear molecule was precipitated. The PEG was collected and dried under reduced pressure. Thereby, 100 g of a PEG having a carboxyl group at each end of the linear molecule was obtained.

Example 1

(1) Preparation of Aqueous Dispersion of Pseudopolyrotaxane from α-Cyclodextrin and a PEG Having Carboxyl Group at Each End of the Linear Molecule A 1-L flask with a stirrer was charged with 650 mL of water, 20 g of the PEG having a carboxyl group at each end of the linear molecule prepared in Production Example 1, and 80 g of α-cyclodextrin, and the mixture was heated to 70° C. to dissolve the substances.

The solution was cooled to 5° C. at a cooling speed of 0.4° C./min while being stirred by a stirring blade at a rotational speed of 700 rpm, and further stirred at the same temperature for 10 hours. Thereby, a milky aqueous dispersion of pseudopolyrotaxane having favorable fluidity (solids concentration: 13% by weight) was obtained.

Measurement using a laser diffraction particle size analyzer showed that the particles in the aqueous dispersion of pseudopolyrotaxane had a volume average particle size of 10 μm.

(2) Drying of Aqueous Dispersion of Pseudopolyrotaxane

The prepared aqueous dispersion of pseudopolyrotaxane (750 g) was dried in a double drum dryer (product of Katsuragi Industry Co., Ltd., type: D-0303) at a drum surface temperature of 120° C. and a drum rotation speed of 1 rpm (drying time: 40 sec), thereby yielding 93 g of a dry product. The film thickness of aqueous dispersion of pseudopolyrotaxane applied on the drum was 0.3 mm. The water content of the resultant dry pseudopolyrotaxane was 2.3% by weight.

Example 2

A dry pseudopolyrotaxane was obtained in the same manner as in Example 1 except that, in the drying of the aqueous dispersion of pseudopolyrotaxane, the drum surface temperature was changed to 170° C. and the drum rotation speed was changed to 2 rpm (drying time: 20 sec). The film thickness of aqueous dispersion of pseudopolyrotaxane applied on the drum was 0.5 mm. The dry pseudopolyrotaxane had a water content of 2.5% by weight.

Example 3

A dry pseudopolyrotaxane was obtained in the same manner as in Example 1 except that, in the drying of the aqueous dispersion of pseudopolyrotaxane, the drum surface temperature was changed to 100° C. and the drum rotation speed was changed to 0.5 rpm (drying time: 90 sec). The film thickness of aqueous dispersion of pseudopolyrotaxane applied on the drum was 0.1 mm. The dry pseudopolyrotaxane had a water content of 5.0% by weight.

Example 4

A dry pseudopolyrotaxane was obtained in the same manner as in Example 1 except that, in the preparation of the aqueous dispersion of pseudopolyrotaxane, the rotational speed of the stirring blade was changed to 75 rpm and the cooling speed was changed to 0.1° C./min. The prepared aqueous dispersion of pseudopolyrotaxane was in a milky form with favorable fluidity, and had a median particle size of 50 μm. The film thickness of aqueous dispersion of pseudopolyrotaxane applied on the drum was 0.3 mm. The dry pseudopolyrotaxane had a water content of 2.0% by weight.

Example 5

A dry pseudopolyrotaxane was obtained in the same manner as in Example 2 except that, in the preparation of the aqueous dispersion of pseudopolyrotaxane, the rotational speed of the stirring blade was changed to 7,000 rpm and the cooling speed was changed to 10° C./min. The prepared aqueous dispersion of pseudopolyrotaxane was in a milky form with slight fluidity and had a median particle size of 1.5 μm. The film thickness of aqueous dispersion of pseudopolyrotaxane applied on the drum was 0.5 mm. The dry pseudopolyrotaxane had a water content of 2.7% by weight.

Example 6

An aqueous dispersion of pseudopolyrotaxane was obtained in the same manner as in Example 1 except that, in the preparation of the aqueous dispersion of pseudopolyrotaxane, the prepared mixture was cooled by allowing it to stand without stirring. Since the prepared aqueous dispersion of pseudopolyrotaxane was in a paste form with little fluidity, the dispersion was diluted with 150 g of water (solids concentration of pseudopolyrotaxane: 11% by weight) and stirred with a spatula to give fluidity. The resultant dispersion was dried in the same manner as in Example 1, thereby yielding a dry pseudopolyrotaxane. The film thickness of aqueous dispersion of pseudopolyrotaxane applied on the drum was 0.3 mm. The dry pseudopolyrotaxane had a water content of 3.1% by weight.

Example 7

A dry pseudopolyrotaxane was obtained in the same manner as in Example 1 except that the PEG having a carboxyl group at each end prepared in Production Example 2 was used. The prepared aqueous dispersion of pseudopolyrotaxane was in a milky form with slight fluidity and had a median particle size of 15 µm. The film thickness of aqueous dispersion of pseudopolyrotaxane applied on the drum was 0.3 mm. The dry pseudopolyrotaxane had a water content of 3.6% by weight.

Example 8

An aqueous dispersion of pseudopolyrotaxane was obtained in the same manner as in Example 7 except that, in the preparation of the aqueous dispersion of pseudopolyrotaxane, the prepared mixture was cooled by allowing it to stand without stirring. Since the prepared aqueous dispersion of pseudopolyrotaxane had no fluidity, the dispersion was diluted with 250 g of water (the solids concentration of the aqueous dispersion of pseudopolyrotaxane: 10% by weight) and stirred with a spatula to give slight fluidity. The resultant dispersion was dried in the same manner as in Example 1, thereby yielding a dry pseudopolyrotaxane. The film thickness of aqueous dispersion of pseudopolyrotaxane applied on the drum was 0.3 mm. The dry pseudopolyrotaxane had a water content of 3.4% by weight.

Comparative Example 1

A pseudopolyrotaxane was obtained in the same manner as in Example 1 except that the aqueous dispersion of pseudopolyrotaxane was freeze dried (dried at −10 to 20° C. for 48 hours). The obtained pseudopolyrotaxane was in the form of porous agglomerates with a water content of 1.2% by weight.

Comparative Example 2

A pseudopolyrotaxane was obtained in the same manner as in Example 1 except that the aqueous dispersion of pseudopolyrotaxane was dried under reduced pressure at 20° C. for 96 hours. The obtained pseudopolyrotaxane was in the form of a hard agglomerate with a water content of 4.0% by weight.

<Evaluation>

The inclusion ratio was measured on each pseudopolyrotaxane obtained in the examples and comparative examples by the following method. Table 1 shows the results.
(1) Capping of Pseudopolyrotaxane Using Adamantane Amine and BOP Reagent Reaction System In a 1-L flask, 0.5 g of an adamantane amine was dissolved in 170 mL of dimethyl formamide (DMF) at room temperature. Then, 50 g of the dry pseudopolyrotaxane was added to the flask and the mixture was promptly shaken well.

Subsequently, a solution in which 1.3 g of a BOP reagent (benzotriazol-1-yl-oxy-tris(dimethylamino)phosphonium hexafluorophosphate) was dissolved in 80 mL of DMF was added to the flask, and the mixture was promptly shaken well.

Furthermore, to the flask was added a solution in which 0.50 mL of diisopropylethylamine was dissolved in 80 mL of DMF, and the mixture was promptly shaken well. The resultant mixture was allowed to stand in a refrigerator overnight.
(2) Purification of Polyrotaxane and Measurement of Inclusion Ratio The obtained mixture was subjected to a cleaning operation in which 300 mL of DMF was added to the flask and the mixture was mixed well and centrifuged, and then the supernatant was discarded. The cleaning operation using DMF was repeated twice in total to obtain a precipitate. The obtained precipitate was subjected to a cleaning operation in which the precipitate was dispersed in 2,000 mL of hot water (70° C.) and the mixture was well stirred and then filtered.

The cleaning operation with hot water was repeated four times in total. The obtained precipitate was freeze dried, thereby finally yielding a purified polyrotaxane.

The inclusion ratio of the obtained polyrotaxane was determined by $^1$H-NMR. The obtained inclusion ratio can be regarded as the inclusion ratio of the pseudopolyrotaxane.

TABLE 1

|  | Inclusion ratio |
| --- | --- |
| Example 1 | 0.27 |
| Example 2 | 0.29 |
| Example 3 | 0.28 |
| Example 4 | 0.28 |
| Example 5 | 0.24 |
| Example 6 | 0.25 |
| Example 7 | 0.22 |
| Example 8 | 0.21 |
| Comparative Example 1 | 0.19 |
| Comparative Example 2 | 0.18 |

INDUSTRIAL APPLICABILITY

The present invention can provide a method for producing a pseudopolyrotaxane which includes an industrially advantageous method of producing a dry pseudopolyrotaxane with a high inclusion ratio.

The invention claimed is:
1. A method for producing dried pseudopolyrotaxane, comprising:
   an inclusion step of mixing polyethylene glycol and cyclodextrin in an aqueous medium so as to form an aqueous dispersion of pseudopolyrotaxane,
      wherein the pseudopolyrotaxane comprises pseudopolyrotaxane particles, in which the polyethylene glycol is included in cavities of molecules of the cyclodextrin in a skewered manner; and
   a drying step of drying the aqueous dispersion of the pseudopolyrotaxane produced in the inclusion step so as to form the dried pseudopolyrotaxane,
      wherein in the drying step, the aqueous dispersion of the pseudopolyrotaxane is dried in a form of a thin film by using a drum dryer at a drying temperature in a range from 70 to 200° C.
2. The method for producing the dried pseudopolyrotaxane according to claim 1,
   wherein the polyethylene glycol has a weight average molecular weight of 1,000 to 500,000.

3. The method for producing the dried pseudopolyrotaxane according to claim 1,
wherein a weight ratio between the polyethylene glycol and the cyclodextrin is in a range from 1:2 to 1:5.

4. The method for producing the dried pseudopolyrotaxane according to claim 1,
wherein, in the inclusion step, the polyethylene glycol and the cyclodextrin are dissolved in the aqueous medium so as to prepare a mixed solution, and
the mixed solution is continuously or intermittently cooled while being flowed so as to precipitate the pseudopolyrotaxane particles, thereby producing the aqueous dispersion of the pseudopolyrotaxane.

5. The method for producing the dried pseudopolyrotaxane according to claim 4,
wherein a cooling speed is in a range from 0.01 to 30° C./min.

6. The method for producing the dried pseudopolyrotaxane according to claim 1,
wherein a solid concentration of the aqueous dispersion of the pseudopolyrotaxane is in a range from 5 to 25% by weight.

7. The method for producing the dried pseudopolyrotaxane according to claim 1,
wherein the pseudopolyrotaxane particles in the aqueous dispersion of the pseudopolyrotaxane have a volume average particle size in a range from 1 to 200 μm.

8. The method for producing the dried pseudopolyrotaxane according to claim 1,
wherein a pressure in a system in the drying step is equal to or lower than the atmospheric pressure.

9. The method for producing the dried pseudopolyrotaxane according to claim 1,
wherein a drying time in the drying step is 10 minutes or less.

* * * * *